US009465728B2

(12) United States Patent
Tsai et al.

(10) Patent No.: US 9,465,728 B2
(45) Date of Patent: Oct. 11, 2016

(54) MEMORY CONTROLLER ADAPTABLE TO MULTIPLE MEMORY DEVICES

(75) Inventors: Howard Tsai, Cupertino, CA (US); Dmitry Vyshetsky, Cupertino, CA (US); Neal Meininger, San Jose, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 1002 days.

(21) Appl. No.: 12/939,135

(22) Filed: Nov. 3, 2010

(65) Prior Publication Data
US 2012/0110242 A1 May 3, 2012

(51) Int. Cl.
*G06F 12/00* (2006.01)
*G06F 12/02* (2006.01)
*G06F 13/16* (2006.01)

(52) U.S. Cl.
CPC .............. *G06F 12/02* (2013.01); *G06F 12/00* (2013.01); *G06F 13/16* (2013.01); *G06F 13/1689* (2013.01)

(58) Field of Classification Search
CPC ........ G06F 12/00; G06F 12/02; G06F 13/16; G06F 13/1689
USPC ....................................................... 711/101
See application file for complete search history.

(56) References Cited

U.S. PATENT DOCUMENTS

| 4,360,916 | A | 11/1982 | Kustedjo et al. |
| 5,343,481 | A | 8/1994 | Kraft |
| 5,533,035 | A | 7/1996 | Saxena et al. |
| 5,603,001 | A * | 2/1997 | Sukegawa et al. ........... 711/103 |
| 5,734,926 | A | 3/1998 | Feeley et al. |
| 5,787,279 | A | 7/1998 | Rigoutsos |
| 5,878,279 | A | 3/1999 | Athenes |
| 6,000,006 | A | 12/1999 | Bruce et al. |
| 6,119,196 | A | 9/2000 | Muller et al. |
| 6,222,144 | B1 * | 4/2001 | Nishikawa ..................... 200/537 |
| 6,223,144 | B1 | 4/2001 | Barnett |
| 6,636,940 | B1 * | 10/2003 | Hodges ......................... 711/112 |
| 6,760,743 | B1 | 7/2004 | Heddes et al. |
| 6,772,276 | B2 | 8/2004 | Dover |
| 6,985,977 | B2 | 1/2006 | Vrancic |
| 7,100,103 | B2 | 8/2006 | Mizrachi et al. |

(Continued)

FOREIGN PATENT DOCUMENTS

| EP | 0502211 | 9/1992 |
| EP | 1271332 | 1/2003 |

(Continued)

OTHER PUBLICATIONS

8273A High Performance Programmable DMA Controller' datasheet by Intel, Oct. 1989.

(Continued)

*Primary Examiner* — Larry Mackall

(57) ABSTRACT

A memory controller, in one embodiment, includes a command translation data structure, a front end and a back end. The command translation data structure maps command operations to primitives, wherein the primitives are decomposed from command operations determined for one or more memory devices. The front end receives command operations from a processing unit and translates each command operation to a set of one or more corresponding primitives using the command translation data structure. The back end outputs the set of one or more corresponding primitives for each received command operation to a given memory device.

16 Claims, 6 Drawing Sheets

(56) References Cited

U.S. PATENT DOCUMENTS

| | | | |
|---|---|---|---|
| 7,237,016 B1 | 6/2007 | Schober | |
| 7,386,683 B2 | 6/2008 | Blumrich | |
| 7,392,330 B2 | 6/2008 | Weatherspoon | |
| 7,454,546 B1 | 11/2008 | Lilley | |
| 7,457,897 B1 | 11/2008 | Lee et al. | |
| 7,603,523 B2 | 10/2009 | Blumrich | |
| 7,689,998 B1 | 3/2010 | Chrysanthakopoulos | |
| 7,761,636 B2 | 7/2010 | Mott et al. | |
| 7,877,254 B2 | 1/2011 | Luan et al. | |
| 7,877,524 B1 | 1/2011 | Annem et al. | |
| 7,979,615 B1 | 7/2011 | Spitzer | |
| 8,103,836 B2 | 1/2012 | Blumrich | |
| 8,108,590 B2 | 1/2012 | Chow et al. | |
| 8,694,750 B2 | 4/2014 | Vyshetski | |
| 8,732,350 B2 | 5/2014 | Vyshetski | |
| 9,208,108 B2 | 12/2015 | Vyshetsky et al. | |
| 2002/0078270 A1 | 6/2002 | Hofstee et al. | |
| 2002/0161941 A1 | 10/2002 | Chue et al. | |
| 2003/0172147 A1 | 9/2003 | Chang et al. | |
| 2004/0044811 A1 | 3/2004 | Vrancic | |
| 2004/0186946 A1 | 9/2004 | Lee | |
| 2005/0057973 A1 | 3/2005 | Khatami et al. | |
| 2005/0097182 A1 | 5/2005 | Bishop | |
| 2005/0097183 A1 | 5/2005 | Westrelin | |
| 2005/0160200 A1 | 7/2005 | Saito | |
| 2005/0289253 A1 | 12/2005 | Edirisooriya et al. | |
| 2006/0004931 A1 | 1/2006 | Weatherspoon | |
| 2006/0075395 A1* | 4/2006 | Lee et al. | 717/168 |
| 2006/0136570 A1 | 6/2006 | Pandya | |
| 2006/0152981 A1 | 7/2006 | Ryu | |
| 2006/0236039 A1 | 10/2006 | Golander | |
| 2007/0073920 A1 | 3/2007 | Wu et al. | |
| 2007/0174495 A1* | 7/2007 | Tung et al. | 710/5 |
| 2008/0034153 A1 | 2/2008 | Lee et al. | |
| 2008/0126684 A1 | 5/2008 | Wu et al. | |
| 2008/0140910 A1 | 6/2008 | Flynn et al. | |
| 2008/0250195 A1 | 10/2008 | Chow et al. | |
| 2008/0270681 A1 | 10/2008 | Van Acht et al. | |
| 2009/0002761 A1 | 1/2009 | La et al. | |
| 2009/0070520 A1 | 3/2009 | Mizushima | |
| 2009/0100307 A1 | 4/2009 | Lee | |
| 2009/0138654 A1 | 5/2009 | Sutardja | |
| 2009/0150605 A1 | 6/2009 | Flynn et al. | |
| 2009/0287876 A1* | 11/2009 | Yeh | 711/103 |
| 2009/0300318 A1 | 12/2009 | Allen et al. | |
| 2010/0146171 A1* | 6/2010 | Takemae | G06F 13/1694 710/107 |
| 2010/0268864 A1 | 10/2010 | Ramiya Mothilal | |
| 2011/0055668 A1 | 3/2011 | Kim et al. | |
| 2011/0131354 A1* | 6/2011 | Smith et al. | 710/74 |
| 2011/0161553 A1 | 6/2011 | Saxena et al. | |
| 2011/0161561 A1 | 6/2011 | Tsai et al. | |

FOREIGN PATENT DOCUMENTS

| | | |
|---|---|---|
| EP | 1840722 | 10/2007 |
| JP | 2004110436 | 4/2004 |
| JP | 2004110438 | 4/2004 |
| JP | 2007034581 | 2/2007 |
| JP | 2008158991 | 7/2008 |

OTHER PUBLICATIONS

Express Apps—PEX 8311' by PLX Technology, Jan. 2006.

Wikipedia—Microcontroller article found on http://web.archive.org from Nov. 27, 2007.

Ashok Sharma, Advanced Semiconductor Memories Architecture, Designs, and Applications, IEEE Press, 2003, at 393-401.

Gupta, A. et al.: DFTL: A Flash Translation Layer Employing Demand-based Selective Caching of Page-level1 Address Mappings. In: Proceedings of the 14th international conference on Architectural support for programming languages and operating systems, ASPLOS '09, Mar. 7-11, 2009, Washington, DC, USA. pp. 229-240.

* cited by examiner

MEMORY CONTROLLER ADAPTABLE TO MULTIPLE MEMORY DEVICES

CROSS-REFERENCE TO RELATED APPLICATIONS

This is a continuation of U.S. patent application Ser. No. 12/904,733 filed Oct. 14, 2010.

BACKGROUND OF THE INVENTION

Conventional electronic devices regularly include one or more types of memories. Typically a memory controller is utilized to manage the flow of data between one or more processing units and one or more memory units of the electronic device. A common type of memory in conventional electronic devices is the flash memory. Flash memory is designed to be erased and programmed in large sections of the memory.

In the conventional art there are multiple architectures, command sets, protocols, bus interfaces and the like standards for memory devices. For example, there are also multiple standards for flash memory devices, such as legacy, ONFI, Samsung and JEDEC. Such flash memory standards are each slightly different, and each allow for vendor specific commands. A conventional memory controller typically functions with a single memory standard or a small subset of the standards. The different architectures, command sets, protocols, signal interface definitions and the like prevent a conventional memory controller from supporting memory accesses to different memory devices. Accordingly, there is a continuing need for memory controller techniques to support multiple standards.

SUMMARY OF THE INVENTION

The present technology may best be understood by referring to the following description and accompanying drawings that are used to illustrate embodiment of the present technology.

Embodiments of the present technology are directed toward programmable memory controllers, and the setup and operation thereof. In a setup embodiment, command sets for one or more memory devices are determined. The one or more memory devices may include one or more flash memory devices having one or more different architectures, conforming to different standards, utilizing different communication protocols, having different interfaces and/or the like. Each of the command operations are decomposed into one or more primitives. The primitives may include command cycles, address cycles, and/or data cycles. A mapping between the command operations and the one or more primitives are stored in a command translation data structure of a memory controller.

In an operation embodiment, a command translation data structure of a memory controller is programmed with a mapping between one or more command operations and one or more primitives. The one or more primitives were decomposed from one or more command operations determined for one or more memory devices. Thereafter, the memory controller receives command operations from one or more processing units. Each received command operation is translated by the memory controller to a set of one or more corresponding primitives using the command translation data structure. The memory controller then outputs the set of one or more corresponding primitives for each received command operation. The appropriate primitives are output to an appropriate memory device and/or an appropriate processing unit.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION OF THE INVENTION

Reference will now be made in detail to the embodiments of the present technology, examples of which are illustrated in the accompanying drawings. While the present technology will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Embodiments of the present technology are directed toward programmable memory controller techniques that support different command sets, protocols and interfaces and new command sets, protocols and interfaces in the future. In addition, embodiments reduce the amount of data passed between the processor and the memory controller for each command.

Figure 1:
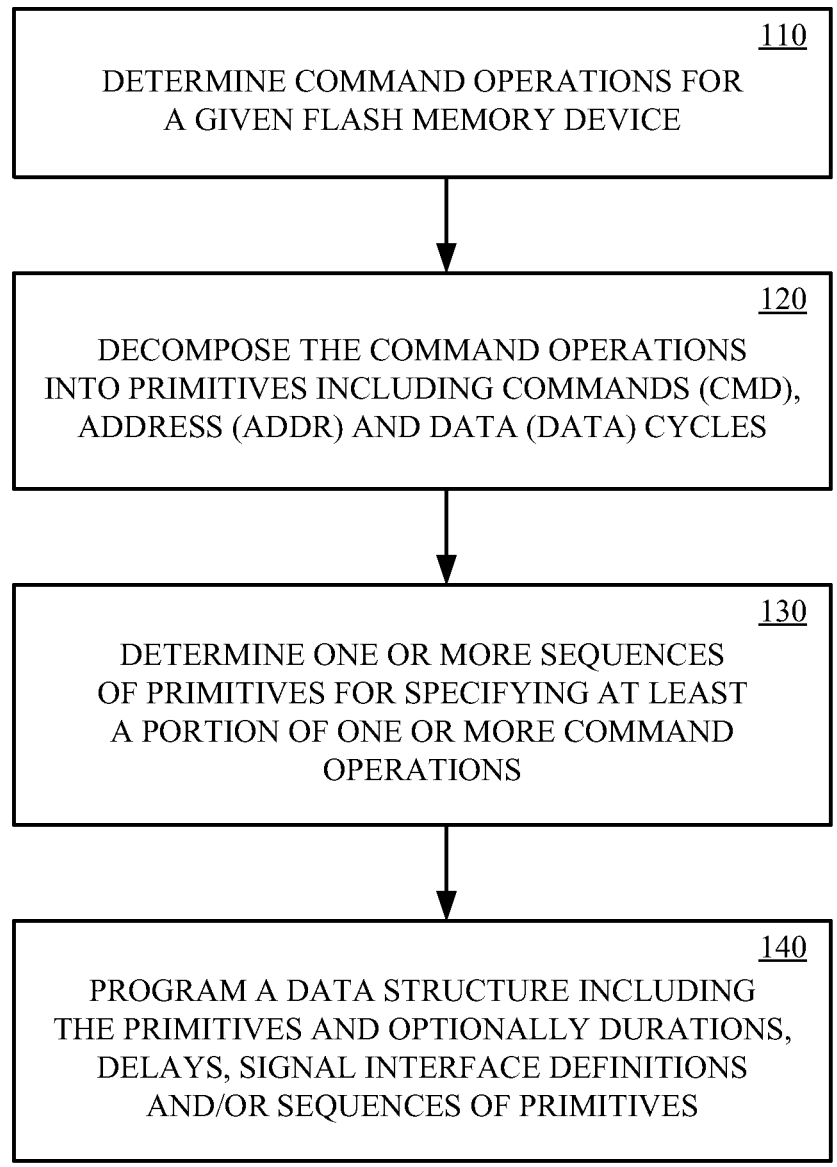
FIG. 1 shows a flow diagram of a memory controller setup process, in accordance with one embodiment of the present technology.
Figure 2:
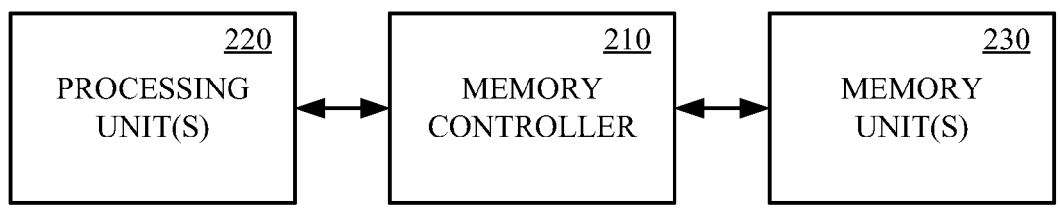
FIG. 2 shows a block diagram of an exemplary system including a memory controller, in accordance with one embodiment of the present technology.

Referring to FIG. 1, a memory controller setup process, in accordance with one embodiment of the present technology, is shown. The setup process of the memory controller will be further explained with reference to FIG. 2, which shows an exemplary system including a memory controller. The memory controller 210 manages the flow of data between one or more processing units 220 and one or more memory units 230. The processing unit 200 may be a microprocessor, a central processing unit (CPU), graphics processing unit (GPU), a microcontroller, or any other similar processing unit. In one implementation, the memory unit 230 may be a flash memory array, circuit, chip, card, module or the like. In one implementation, the memory controller 210 may be a separate circuit. In another implementation, the memory controller 210 may be integral to a processing unit 220.

Referring again to FIG. 1, the setup process includes determining command operations for one or more memory devices, at 110. In one implementation, the memory devices may be one or more different flash memory devices. The command operations may include, for example, page read, page write, and the like, for one or more memory standards such as ONFI, JEDEC, and/or the like. The command operations may include one or more sets of one or more command operations making up one or more protocols. The command operations may also be associated with one or more signal interface definitions.

At 120, the command operations are each decomposed into one or more primitives of one or more cycles. The primitives may include one or more command (CMD) cycles, one or more address (ADDR) cycles, and/or one or more data (DATA) cycles. The command operations may also be decomposed into one or more durations for one or more of the primitives for each of one or more protocols corresponding to one or more sets of the one or more command operations. The command operation may also be decomposed into one or more delays after one or more primitives for each of one or more protocols corresponding to one or more sets of one or more command operations. The durations before one or more primitives and/or delays after one or more primitives may implement timing parameters of the one or more protocols. The command operation may also be decomposed into one or more signal interfaces definitions for one or more sets of command operations. The signal interface definitions may define the state and/or use of various pins for each primitive and/or protocol.

Figure 3:
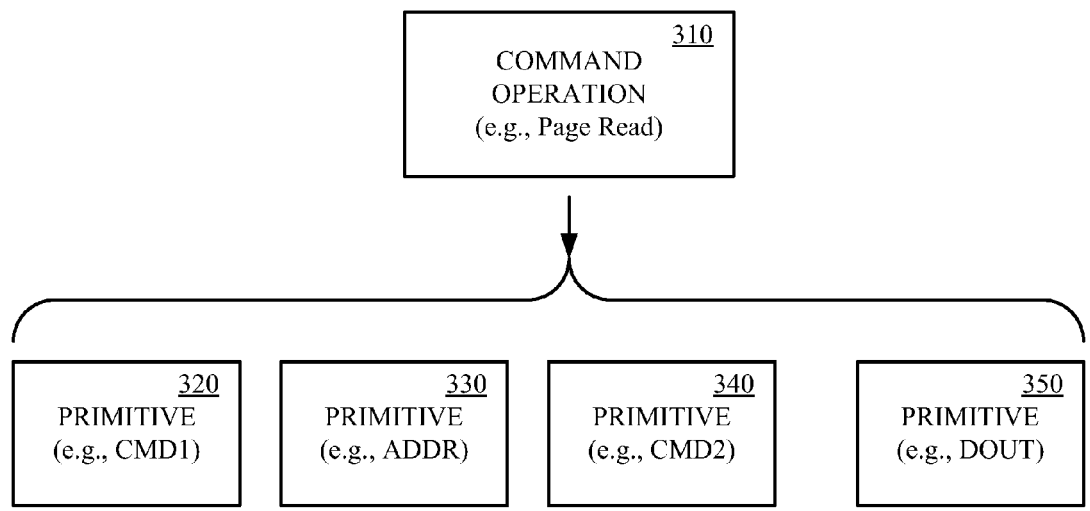
FIG. 3 illustrates an example of decomposing of a command operation into primitives, in accordance with one embodiment of the present technology.

Referring to now FIG. 3, an example decomposition of a command operation 310 into primitives 320-350 is illustrated. The command operation 310 may be for example a page read command operation and the primitives may include a 'read' primitive (e.g., CMD1) 320, an 'address' primitive (e.g., ADDR) 330, and a 'go' primitive (e.g., CMD2) 340, and a 'data out' primitive (e.g., DOUT) 350. In another example, a page write operation may be decomposed into a 'write' primitive (e.g., CMD3), an 'address' primitive (e.g., ADDR), a 'data in" primitive (e.g., DIN), and a 'go' primitive (e.g., CMD2). The 'read' primitive (e.g., CMD1), 'go' primitive (e.g., CMD2), and 'write' primitive (e.g., CMD3) are examples of command cycle primitives. The 'address' primitive (e.g., ADDR) is an example of an address cycle primitive. The 'data in" primitive (e.g., DIN) and 'data out' primitive (e.g., DOUT) are examples of data cycle primitives.

By breaking down the memory protocol into primitives, arbitrarily complex sequences can be constructed by chaining together the primitives as building blocks. At 130, one or more sequences of primitives for specifying at least a portion of one or more command operations may optionally be determined. In one implementation, a macro may be specified for each of one or more commonly used sequence of primitives. The macro for a given sequence is generated from one or more primitives, one or more durations and/or one or more delays. In one implementation, durations and delays may be implemented by the concept of 'busy' and/or 'poll.' Busy and/or polling concepts are utilized to implement timing between the primitives. Busy, however, is not put on the bus. An exemplary set of primitives and macros is illustrated in Table 1.

TABLE 1

| ID | Primitive/Macros | Exemplary commands that use the primitive/macros |
|---|---|---|
| 0 | Busy, CMD, Busy | Basic Primitive, Reset, Cache Read Issue |
| 1 | Busy, DOUT, Busy | Basic Primitive, Data phase of Read |
| 2 | Busy, CMD, Busy, DOUT, Busy | Read Status |
| 3 | Busy, CMD, ADDR, Busy, DOUT, Busy | Read Status Enhanced, Read ID |
| 4 | Busy, CMD, ADDR, Busy | Read Parameter Page, Read Unique ID, Cache Read Issue |
| 5 | Busy, CMD1, ADDR, CMD2, Busy | Block Erase, Copyback Read, Read Issue |
| 6 | Busy, CMD, ADDR, DIN, Busy | Basic Primitive, Page Program Issue |
| 7 | Busy, ADDR, Busy | Basic Primitive, adds flexibility to unforeseen sequences |
| 8 | Busy, DIN, Busy | Data Input (Write) |
| 9 | Busy, CMD1, ADDR, DIN, CMD2, Busy | Page Program Issue + Program |
| 10 | Busy, CMD1, ADDR, CMD2, Busy, DOUT, Busy | Page Read Issue + Data Read |

At 140, the one or more primitives are stored in a command translation data structure of the memory controller. The command translation data structure may be programmed with a mapping between the command operations and the primitives of the programmable memory controller. The mapping between the one or more command operations and the one or more sequences of primitives may also include one or more durations for one or more primitives for each of one or more protocols corresponding to one or more sets of the one or more command operations for one or more memory devices. The mapping between the one or more command operations and the one or more sequences of primitives may also include one or more delays after one or more of the primitives for each of one or more protocols corresponding to one or more sets of the command operations for one or more of the memory devices. The mapping between the one or more command operations and the one or more sequences of primitives may also include one or more signal interface definitions for one or more sets of command operations for one or more memory devices. The data structure may be programmed, as microcode or the like, into the memory controller at the beginning of boot. The microcode is written and programmed into the memory controller to adapt to different memory device standards, different protocols, and/or specific features for one or more different memory devices.

If one or more sequences of primitives are also determined at 130, the sequences may also be stored as macros in the command translation data structure. In such case, the data structure provides a mapping between operation commands and the primitives and optionally the macros for each standard. In another implementation, firmware of the memory controller may be programmed to selectively execute the one or more sequences of primitives.

The above described setup process may be implemented in hardware, software (e.g., computing device executable instructions stored in one or more computing device readable media), firmware (e.g., computing device programmable circuits) or one or more combinations of hardware, software and/or firmware.

Figure 4:
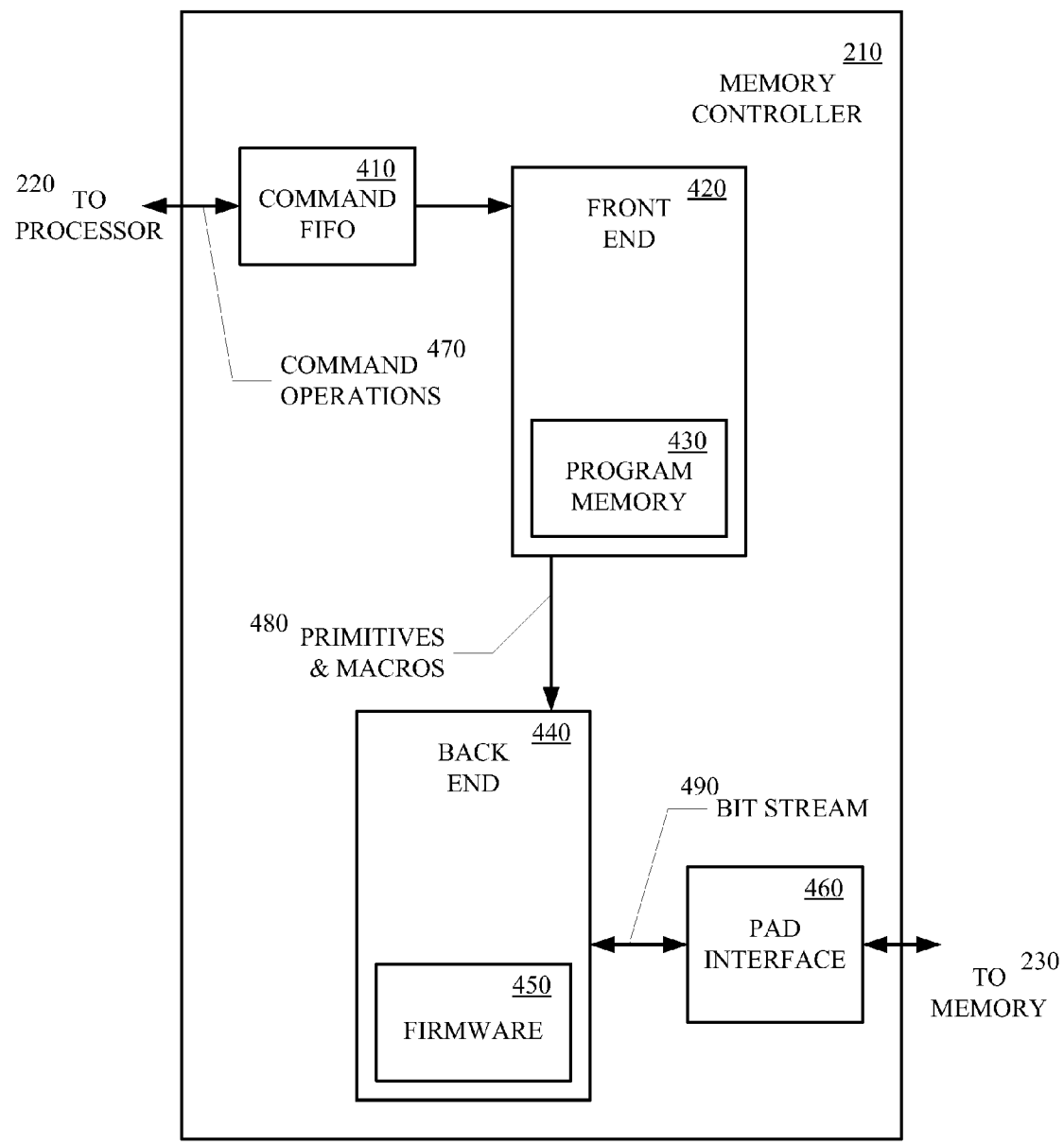
FIG. 4 shows a block diagram of an exemplary memory controller, in accordance with one embodiment of the present technology.

Referring now to FIG. 4, an exemplary memory controller, in accordance with one embodiment of the present technology, is shown. Operation of the exemplary memory controller will be further explained with reference to FIG. 5. The memory controller 210 may include a command buffer 410, a front end 420, controller memory (e.g., computing device readable media) 430, a backend 440, controller firmware 450, and a pad interface 460. It is appreciated that the controller also include a plurality of other elements, such as command first-in-first-out (FIFO) buffers, data and address FIFO buffers, sequencer FIFO buffers, status registers, configuration registers, control logic, and/or the like. In addition, one or more elements may be arranged as a plurality of sub-elements, such as a write backend and a read backend. Similarly, the front end 420 may include the program memory 430 and/or the back end 440 may include the programmable firmware 450.

Figure 5:
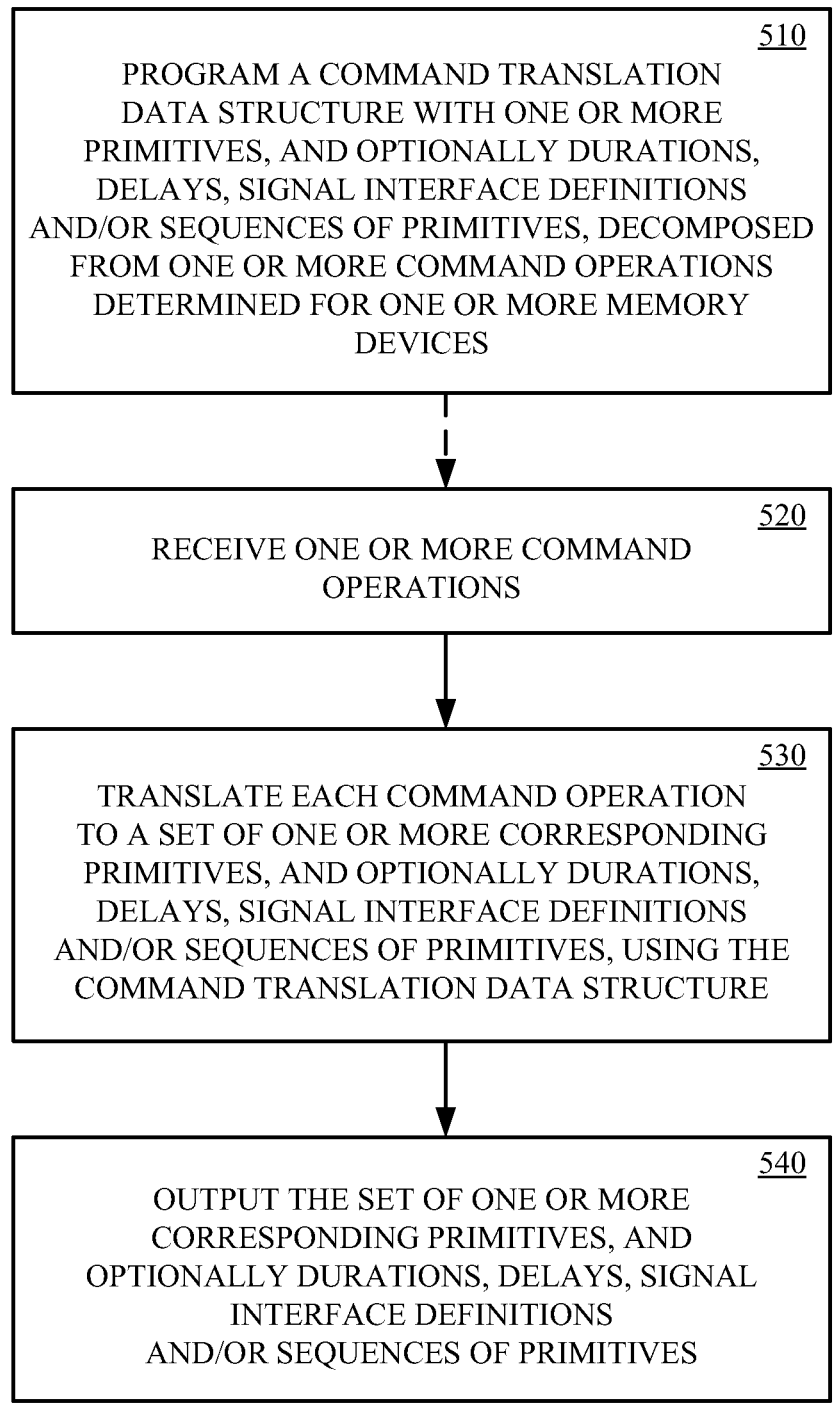
FIG. 5 shows a flow diagram of operation of a memory controller, in accordance with one embodiment of the present technology.

Referring now to FIG. 5, a command translation data structure of the memory controller is programmed with one or more primitives decomposed from one or more command operations determined for one or more memory devices, at 510. In one implementation, the command translation data structure is stored in the controller memory 430. The command translation data structure may be programmed in a setup process, such as at the beginning of boot. The command translation data structure may include mappings between one or more command operations and one or more primitives. The command translation data structure may also include mappings between one or more command operations and one or more sequences of one or more primitives. The mappings of the command translation data structure may also include one or more durations for one or more primitives for each of one or more protocols corresponding to one or more sets of the one or more command operations for one or more memory devices. The mappings of the command translation data structure may also include one or more delays after one or more of the primitives for each of one or more protocols corresponding to one or more set of the command operations for one or more of the memory devices. The mappings of the command translation data structure may also include one or more signal interface definitions for one or more sets of command operations for one or more memory devices.

Thereafter, command operations 470 are received by the memory controller 210 from one or more processing units 220, at 520. In one implementation, the received command operations 470 may be buffered in the command buffer 410 of the memory controller 210. The command buffer 410 may be a first-in-first-out (FIFO) buffer.

At 530, the command operations 470 are each translated by the memory controller to a set of one or more corresponding primitives 480 using the command translation data structure. Portions of given command operations may also be translated to one or more sequences of one or more primitives, referred to herein as macros, using the command translation data structure. Translation of the command operations to one or more corresponding primitives and/or sequences of one or more primitives may also include a duration of one or more of the primitives. Translation of the command operations may also include one or more delays after one or more of the primitives. Translation of the command operations to one or more corresponding primitives and/or sequences may also include one or more signal interface definitions. In one implementation, the front end 420 converts received command operations 470 into a set of primitives and/or macros 480 as mapped in the command operation primitive data structure in the program memory 430.

In one implementation, to perform a page read, a front end of the memory controller using table 1 may issue a '0' primitive code followed by a '1' primitive code, or it can issue a '2' primitive code to accomplish the same task. The flexibility allowed by the former however allows the interleaving of operations across different chip enables (CEs) or logical units (LUNs) of a memory cell array. Such interleaving of primitives may improve performance. In another example, this approach allows for support of an 8 KB page device even though the hardware is designed to support 4 KB only. This can be done by issuing a 6, 8 and 0.

In another implementation, the primitives are used as part of a micro-instruction set and a set of memory controller commands maybe arranged as a table of pointers, or substantially microcode. An exemplary micro-instruction set and corresponding set of memory controller commands is illustrated in Table 2.

| COMMON | | | | | | | | | | |
|---|---|---|---|---|---|---|---|---|---|---|
| 2 | 7 | 3 | 3 | 3 | 1 | | | | | |
| JUMP/CALL/LAST | NXT PTR | HEAD | TAIL | OPCODE | PAD_SEL | 0 IDLE | | LEN_X | LEN_M | 1 CE ACT |
| | | | | | | 1 CMD | | | 8 OPCODE | |
| | | | | | | 2 ADDR Cmd | 5 SE_AMASK | | | 3 |
| | | | | | | 3 ADDR Immediate | | | 8 ADDR | |
| | | | | | | 4 DATA WR | | 1 SECT | | 7 |
| | | | | | | 5 DATA RD | | 1 SECT | | 7 |
| | | | | | | 6 STATUS Check | | 7 TO PTR | | 1 |
| | | | | | | 7 RESERVED | | | | 8 |

At 540, set of primitives are output from the memory controller to one or more memory devices and/or one or more processing units. In one implementation, the back end 440 encodes the appropriate parameters of the primitives and/or macros 480 including any applicable durations and/or delays. The back end 440 then converts the set of primitives and/or macros 480 corresponding to each received command operation 470 into a corresponding bit stream 490 according to any applicable signal interface definition. The pad interface 460 outputs the bit stream 490 with the appropriate timing.

In another implementation, select primitives and/or macros may be built into a hardware sequence. The hardware sequence may be implemented in programmable firmware 450 of the back end 440.

Figure 6:
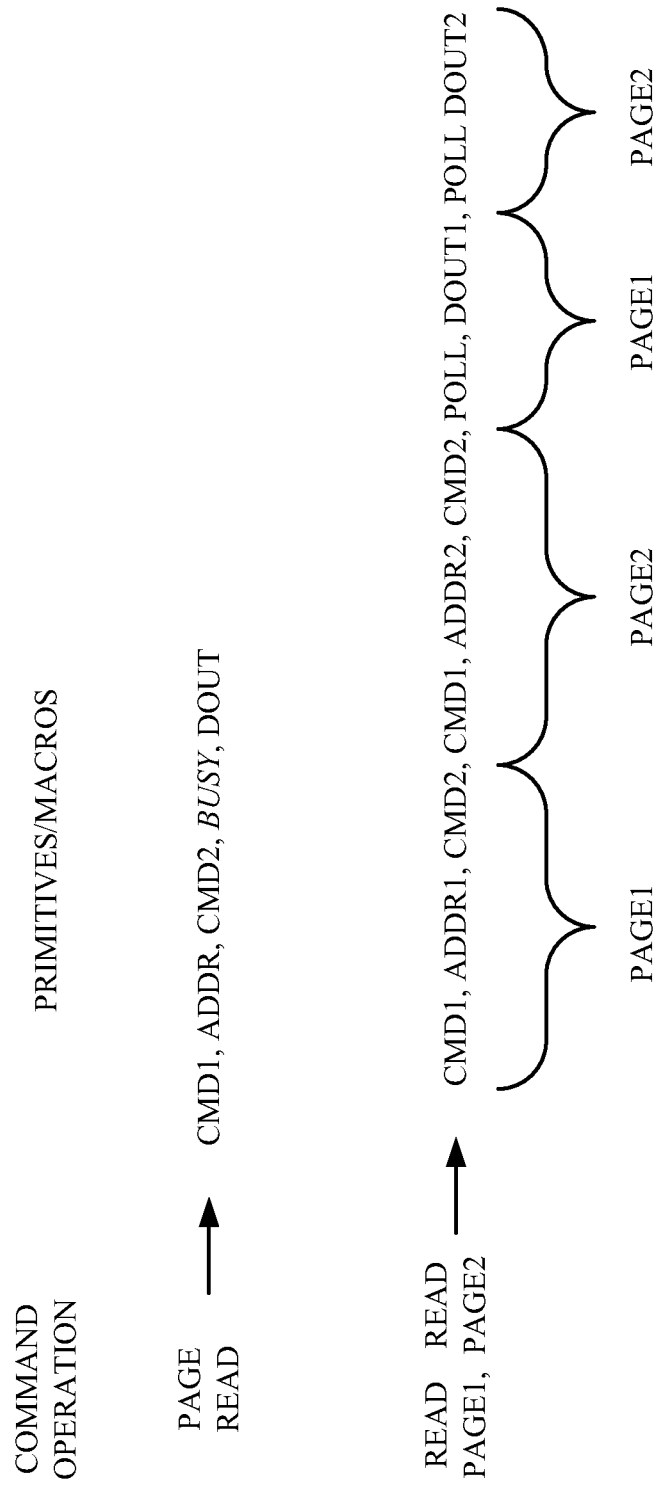
FIG. 6 illustrates an example of interleaving one or more sets of primitives and/or macros, in accordance with one embodiment of the present technology.

The back end 450 may also interleave one or more sets of primitives and/or macros as illustrated in FIG. 6. For example, each page read may be translated into a first command primitive (e.g., CMD1), and address primitive (e.g., ADDR), a second command primitive (e.g., CMD2), a delay (e.g., Busy), and a data primitive (e.g., DOUT). Two page reads can be interleaved such that a portion of the primitives of the second page read are issued during a delay (e.g., Busy) in the first page read. In such case, the first command primitive for the second page read (e.g., PAGE2) can be issued during the delay (e.g., Busy) of the first page read (e.g., PAGE1). As a result of the interleaved page reads, the data returned from the memory unit is returned sequentially, and therefore the corresponding data primitives (e.g., DOUT) can be interleaved with any applicable delay (e.g., POLL).

As indicated above, each primitive can be programmed with a duration and/or a delay (in clock cycles) after the primitive. This allows the memory controller 210 to meet whatever timing parameters are needed. For example, a common operation in dealing with flash devices is polling for some kind of ready status. To offload the firmware from having to do this polling manually, and thereby expending clock cycles, support is available to autonomously perform this checking as part of a constructed sequence.

As indicated above, the command translation data structure may be extended to define the state and/or use of the various pins for each primitive thereby addressing varying signal interface definitions. For example, in one standard, pin A sees a clock-like signal that is used to clock in data from the flash and in another standard, pin B is used instead. Similarly, double data rate (DDR) and single data rate (SDR) protocol can also be specified for each primitive.

The above described memory controller and/or functions performed by the memory controller may be implemented in hardware, software (e.g., computing device executable instructions stored in one or more computing device readable media), firmware (e.g., computing device programmable circuits) or one or more combinations of hardware, software and/or firmware.

The foregoing descriptions of specific embodiments of the present technology have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. A method comprising:
   determining command operations for each of a plurality of different memory devices coupled to a memory controller, wherein at least two of the plurality of different memory devices have different erase or program architectures, and wherein the command operations include page read and page write for two or more protocol standards;
   decomposing each command operation into one or more primitives of one or more cycles and one or more durations of the one or more primitives and one or more delays after one or more primitives to implement timing parameters of the two or more protocol standards, wherein one or more command operations or one or more primitives differ from each other between the different memory devices and wherein the one or more primitives of one or more cycles are selected from a group consisting of command cycles, address cycles, and data cycles; and
   storing the one or more primitives along with a mapping between the command operations and the corresponding set of primitives in a command translation data structure of the memory controller, wherein the command translation data structure includes signal interface definitions for each corresponding set of primitives, and wherein at least two different memory devices have different signal interface definitions.

2. The method according to claim 1, wherein the one or more cycles include one or more selected from a group consisting of a command cycle, an address cycle, and a data cycle.

3. The method according to claim 1, further comprising:
   determining one or more sequences of primitives for specifying at least a portion of one or more command operations; and
   storing in a memory controller the one or more sequences of primitives in the command translation data structure.

4. The method according to claim 1, further comprising:
   determining one or more sequences of primitives for specifying at least a portion of one or more command operations; and
   programming firmware of a sequencer in a memory controller to selectively execute each of the one or more sequences of primitives.

5. The method according to claim 1, wherein the command translation data structure includes one or more durations for one or more of the primitives for each of one or more protocols corresponding to one or more sets of the one or more command operations for one or more memory devices.

6. The method according to claim 1, wherein the command translation data structure includes one or more delays after one or more of the primitives for each of one or more protocols corresponding to one or more sets of the command operations for one or more memory devices.

7. The method according to claim 1, wherein the plurality of different memory devices include at least two different flash memory devices.

8. A method comprising:
   programming a command translation data structure in a front end of a memory controller with one or more primitives decomposed from command operations determined for each of a plurality of different memory devices coupled to the memory controller along with a mapping between the command operations and the corresponding primitives, wherein one or more command operations or one or more primitives differ from each other between the different memory devices, wherein the command translation data structure includes one or more durations for one or more of the primitives or one or more delays after one or more of the primitives for each of one or more protocols corresponding to one or more sets of the one or more command operations for one or more memory devices and includes one or more signal interface definitions applicable to one or more sets of the one or more command operations for one or more memory devices, and wherein at least two of the plurality of different memory devices have different erase or program architectures, and wherein the command operations include page read and page write for two or more protocol standards;

receiving, by a command buffer of the memory controller from a processing unit, command operations for a given memory device;

translating, by a front end of the memory controller, each command operation to a set of one or more corresponding primitives for the given memory device using the command translation data structure;

encoding, by a back end of the memory controller, appropriate parameters of the set of one or more corresponding primitives including an applicable duration or delay;

convening, by the back end of the memory controller, the set of one or more corresponding primitives encoded with the applicable duration or delay into a corresponding bit stream according to an applicable signal interface definition; and outputting, from a pad interface of the memory controller to the given memory device, the corresponding bit stream.

9. The method according to claim 8, wherein the command translation data structure is programmed in a setup process of the memory controller.

10. The method according to claim 8, wherein a portion of a given command operation is translated to a corresponding sequence of one or more primitives.

11. The method according to claim 8, wherein the one or more primitives include one or more selected from a group consisting of a command cycle, an address cycle and a data cycle.

12. A memory controller comprising:
a computing device readable media storing, a command translation data structure that maps command operations to corresponding primitives, wherein the primitives are decomposed from command operations determined for each of a plurality of different memory devices coupled to the memory controller, wherein one or more command operations or one or more primitives differ from each other between the different memory devices, wherein the command translation data structure includes one or more durations for one or more of the primitives or one or more delays after one or more of the primitives, and one or more signal interface definitions, and wherein at least two of the plurality of different memory devices have different erase or program architectures, and wherein the command operations include page read and page write for two or more protocol standards;
a front end, implemented by one or more of a group consisting of hardware, computing device programmable circuits, and computing device executable instructions stored in computing device readable media and executed by a computing device, to receive command operations from a processing unit and translate each received command operation to a set of one or more corresponding primitives including one or more durations, one or more delays or one or more signal interface definitions adapted to a corresponding memory standard, memory protocol or specific feature for a given memory device using the command translation data structure; and
a back end, implemented by one or more of a group consisting of hardware, computing device programmable circuits, and computing device executable instructions stored in computing device readable media and executed by a computing device, to output a signal bit steam with appropriate timing corresponding to the set of one or more corresponding primitives and appropriate duration or delay, and with signal interface definition parameter for each received command operation to the given memory device.

13. The memory controller of claim 12, wherein:
the command translation data structure maps command operations to primitives, a duration of one or more primitives, and a delay after one or more primitives;
the front end to translate each received command operation to the set of one or more corresponding primitives and one or more of a corresponding duration and a corresponding delay using the command translation data structure; and
the back end to output the signal bit stream with appropriate timing corresponding to the set of one or more corresponding primitives and one or more of the corresponding duration and the corresponding delay for each received command operation.

14. The memory controller of claim 12, wherein:
the command translation data structure maps at least a portion of one or more command operations to a sequence of primitives, a duration of one or more of the primitives, and a delay after one or more of the primitives;
the front end to translate at least a portion of a given received command operation to a given sequence of primitives, the duration of one or more of the primitives and the delay after one or more of the primitives in the given sequence; and
the back end to output the signal bit stream with appropriate timing corresponding to the given sequence of primitives and the duration of one or more of the primitives and the delay after one or more of the primitives in the given sequence for the given received command operation.

15. The memory controller of claim 12, wherein the plurality of different memory devices include at least two different flash memory devices.

16. The memory controller of claim 12, wherein the primitives include one or more selected from a group consisting of a command cycle, an address cycle, and a data cycle.

* * * * *